US00H002138H

(19) United States

(12) Statutory Invention Registration (10) Reg. No.: US H2138 H

Pullman et al. (43) Published: Jan. 3, 2006

(54) CUSTOM FIT CARBON FIBER COMPOSITE FOREARM CRUTCH

(75) Inventors: David Pullman, Piqua, OH (US); Vernon T. Bechel, Beavercreek, OH (US); Steven L. Donaldson, Beavercreek, OH (US); John D. Camping, Huber Heights, OH (US)

(73) Assignee: The United State of America as represented by the Secretary of the Air Force, Washington, DC (US)

(21) Appl. No.: 09/950,241

(22) Filed: Sep. 7, 2001

Related U.S. Application Data

(60) Provisional application No. 60/267,237, filed on Feb. 8, 2001.

(51) Int. Cl.
*A61H 3/02* (2006.01)

(52) U.S. Cl. ..... 135/71; 135/72

(58) Field of Classification Search ..... 135/71, 135/72, 65, 66, 68, 76, 77
See application file for complete search history.

(56) References Cited

U.S. PATENT DOCUMENTS

| | | | | | |
|---|---|---|---|---|---|
| 2,788,793 | A | * | 4/1957 | Abbott | 135/68 |
| 2,960,095 | A | * | 11/1960 | Smith, Jr. | 135/68 |
| 3,710,807 | A | * | 1/1973 | Ferry | 135/49 |
| 3,999,565 | A | * | 12/1976 | Delacour et al. | 135/65 |
| 4,252,137 | A | * | 2/1981 | Cohen | 135/69 |
| 5,038,811 | A | * | 8/1991 | Gilmore | 135/71 |
| 5,201,334 | A | * | 4/1993 | Tseng | 135/68 |
| 5,329,954 | A | * | 7/1994 | Miyoshi | 135/71 |
| 5,339,850 | A | * | 8/1994 | Mertz | 135/72 |
| 5,378,217 | A | * | 1/1995 | D'Orta | 482/111 |
| 5,482,070 | A | * | 1/1996 | Kelly | 135/66 |
| 5,771,910 | A | * | 6/1998 | Kluttz | 135/68 |
| 5,954,074 | A | * | 9/1999 | Mattson | 135/68 |
| 6,058,953 | A | * | 5/2000 | Stefanelli | 135/66 |
| 6,085,766 | A | * | 7/2000 | Geary | 135/75 |

FOREIGN PATENT DOCUMENTS

| | | | | |
|---|---|---|---|---|
| DE | 3934065 | * | 4/1991 | 135/72 |
| GB | 2155785 | * | 10/1985 | 135/72 |

* cited by examiner

*Primary Examiner*—Michael J. Carone

(74) *Attorney, Agent, or Firm*—Bobby D. Scearce; Thomas L. Kundert

(57) ABSTRACT

A durable, lightweight carbon composite forearm crutch is described that in its essential components includes three graphite/epoxy composite tubes consisting of a main support tube, a handle tube and a cuff support tube, all adhesively bonded to a single central substantially T-shaped metallic, preferably aluminum, fitting configured to dispose the handle and cuff support tubes at a comfortable angle for the user greater than 90° and preferably about 101° to 103°, a cuff attached to the upper end of the cuff support tube for receiving the arm of a user, and a slip resistant foot member at the distal end of the main support tube.

4 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CUSTOM FIT CARBON FIBER COMPOSITE FOREARM CRUTCH

CROSS-REFERENCE TO RELATED APPLICATION

This application claims priority of the filing date of Provisional Application Ser. No. 60/267,237 filed Feb. 8, 2001, the entire contents of which are incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

The present invention relates generally to medical assistance devices for assisting the disabled, and more particularly to an improved custom fit carbon composite forearm crutch.

Contemporary forearm crutches presently available commercially in the domestic U.S. marketplace are typically configured for use by persons with long-term disabilities in their lower extremities. The forearm crutch provides the means for a disabled person to transfer their body weight to their hands and arms while walking. A forearm cuff is usually attached to the crutch in order to provide lateral stability to the user of the crutch. The design, structure and constituent materials of conventionally available crutches have been substantially the same for many decades. The conventional crutch is heavy, and comprises a double telescoping aluminum tube configuration having spring-loaded pins and holes along the length of the telescoping tubes for overall length adjustment of the crutch. The tube structure of the conventional crutch is subject to substantial corrosion and wear, particularly at the hole locations that receive the spring-loaded pins, with the result that the crutch becomes noisy in use usually after only a few months of use. As a consequence, most users replace the crutch after intervals of use of about two months to one year. In addition, conventional metal (aluminum) crutches have an unattractive, institutional, appearance that may be of little consequence to the short-term user but is not pleasing to long-term users.

The invention solves or substantially reduces in critical importance problems with prior art medical assistance devices as just described by providing a durable, lightweight forearm crutch comprising a carbon composite. The crutch of the invention is configured of three graphite/epoxy tubes, one each for the long down tube, the handle and the cuff support, all adhesively bonded to a single central metallic (aluminum) fitting, with appropriate attached tube end fittings, rubber foot, handle end and cuff support. The crutch of the invention is about one-half the weight of and about 20% stronger than the conventional aluminum crutch, has a substantially longer life with substantially less wear than the conventional crutch by reason of fewer mechanical joints and therefore quieter in use than the conventional crutch, and is more aesthetically pleasing than conventional aluminum crutches.

The invention finds substantial use by persons with lower (leg) extremity disability, either temporary or permanent, in commercial, military and government operated medical facilities and in veteran medical and rehabilitation centers.

It is a principal object of the invention to provide an improved crutch for use by the disabled.

It is another object of the invention to provide an improved forearm crutch.

It is another object of the invention to provide a forearm crutch that is significantly stronger than a conventional crutch.

It is another object of the invention to provide a substantially safe forearm crutch.

It is another object of the invention to provide a lightweight forearm crutch that substantially reduces the fatigue factor for the user of the crutch.

It is another object of the invention to provide an improved forearm crutch that is substantially corrosion resistant.

It is another object of the invention to provide an inexpensive, aesthetically pleasing, long lasting forearm crutch.

It is a further object of the invention to provide an improved forearm crutch that may be custom fitted to the user.

It is a further object of the invention to provide a forearm crutch that is substantially quieter than conventional crutches.

These and other objects of the invention will become apparent as a detailed description of representative embodiments proceeds.

SUMMARY OF THE INVENTION

In accordance with the foregoing principles and objects of the invention, a durable, lightweight carbon composite forearm crutch is described that in its essential components includes three graphite/epoxy composite tubes consisting of a main support tube, a handle tube and a cuff support tube, all adhesively bonded to a single central substantially T-shaped metallic, preferably aluminum, fitting configured to dispose the handle and cuff support tubes at a comfortable angle for the user greater than 90° and preferably about 101° to 103°, a cuff attached to the upper end of the cuff support tube for receiving the arm of a user, and a slip resistant foot member at the distal end of the main support tube.

DESCRIPTION OF THE DRAWINGS

The invention will be more clearly understood from the following detailed description of representative embodiments thereof read in conjunction with the accompanying drawings wherein.

DETAILED DESCRIPTION

Figure 1A:
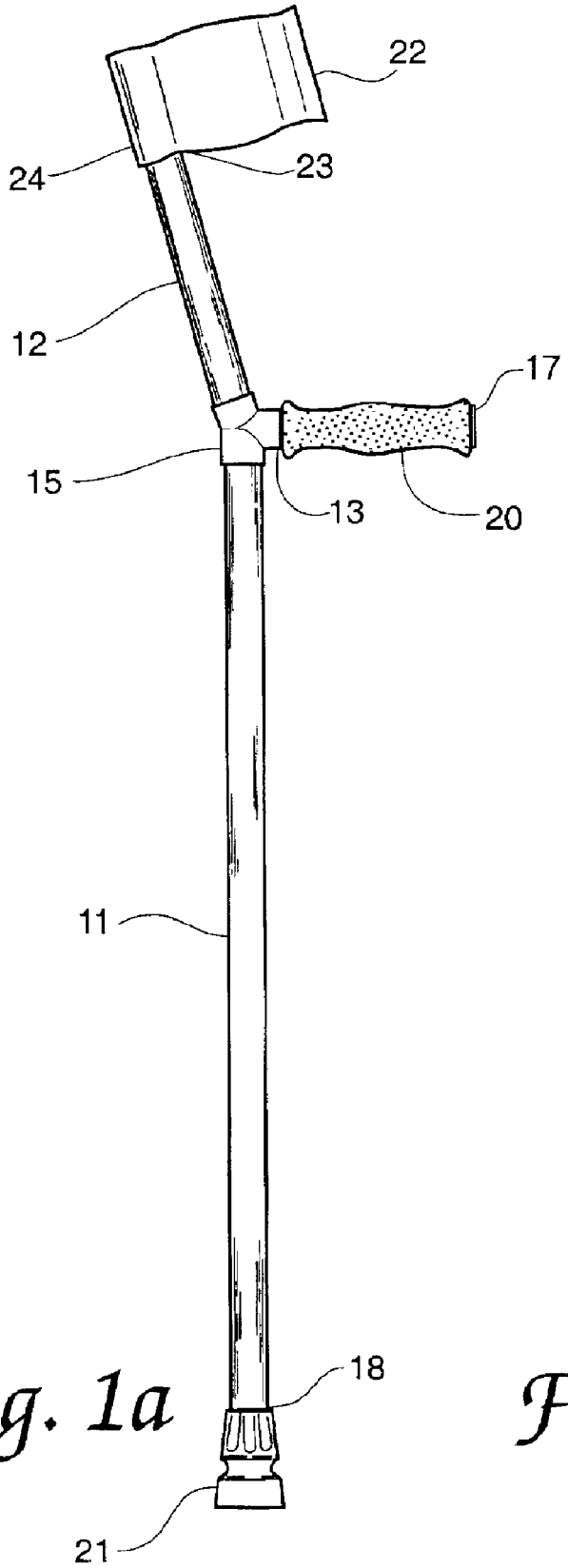
FIGS. 1*a* and 1*b* are front and side elevational views of a composite forearm crutch according to the invention.
Figure 1B:
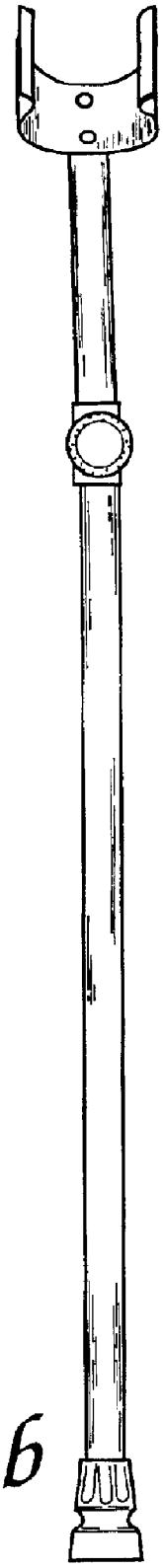
Figure 2:
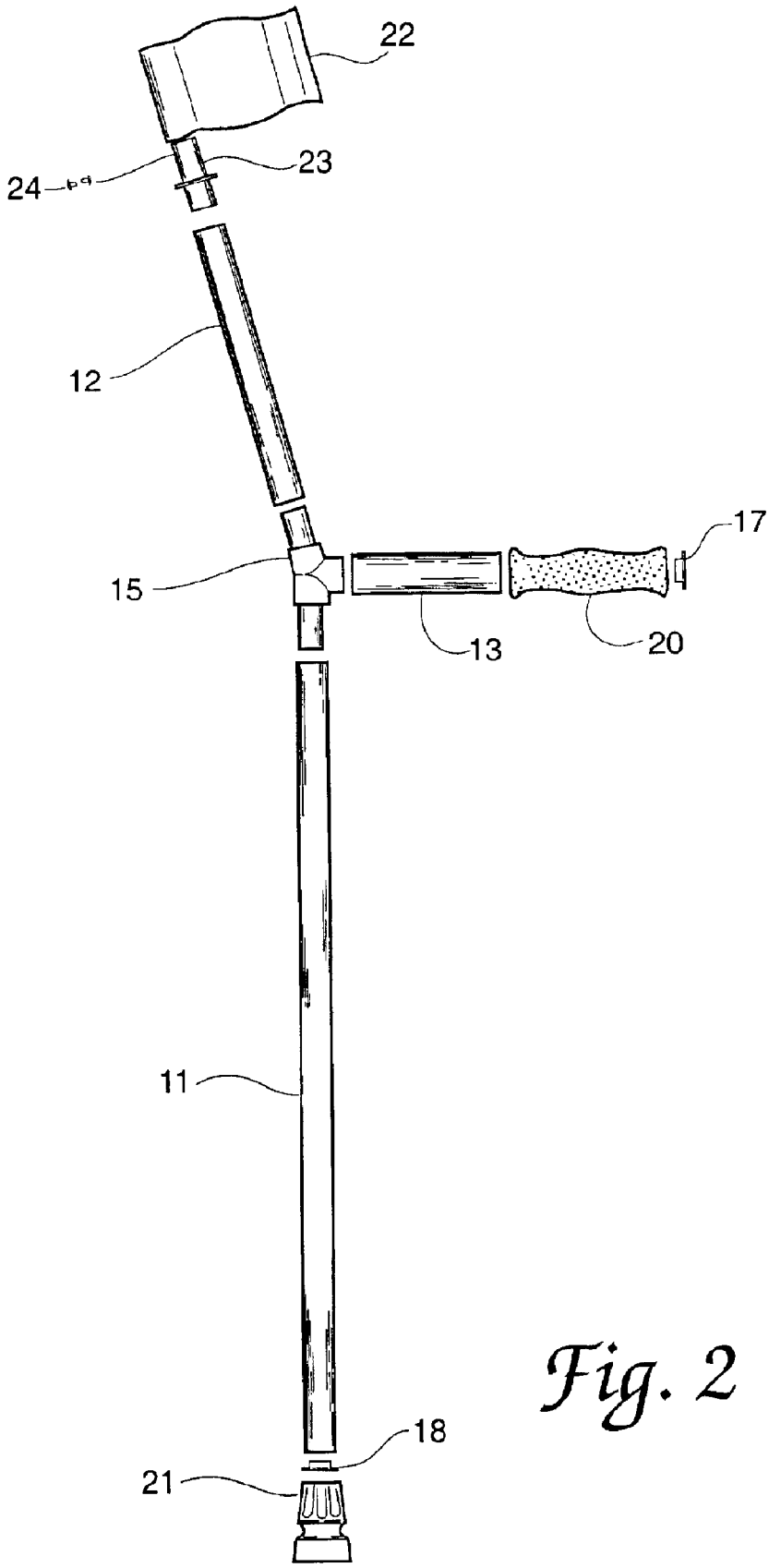
FIG. 2 is an exploded elevational view of the composite forearm crutch shown in FIGS. 1*a* and 1*b* illustrating the essential components thereof.

Referring now to the drawings, FIGS. 1*a* and 1*b* show front and side elevational views of a composite forearm crutch 10 according to the invention, and FIG. 2 shows an exploded elevational view of the crutch 10 of FIG. 1. In FIG. 2 are illustrated the essential components of crutch 10 in an exploded view thereof.

Crutch 10 includes essentially three load bearing members 11,12,13 each of which, in a preferred embodiment of the invention comprises thermally cured graphite/epoxy composite tubes of composition described more fully below. In two non-limiting representative crutch models built and tested in demonstration of the invention, main tube 11 and arm support tube 12 were sized to correspond with the physical size of the individual for which each demonstration model was built. Typically, tube 11 is up to about 34 inches long, and tube 12 up to about 8 inches long. Handle tube 13 was typically about 4¾ inches long. In the demonstration models tubes 11,12,13 were 0.768 inch ID by 0.900 inch OD, size, however, of the tubes not considered limiting of the invention.

In the demonstration models, tubes 11,12,13 comprised 13 plies of graphite/35% epoxy resin including 8 plies along the length of the tube and 5 circumferential plies in order to avoid splitting of the tubes when joined together as described below. The tubes were uniform in cross section and fabricated from graphite fiber reinforced epoxy tape (T50 graphite fiber, std modulus 33 Msi and 150 fiber weight, from FORTAFIL Carbon Fibers, Knoxville Tenn., and #403 epoxy resin, Newport Adhesives and Composites, Inc, Irvine Calif.) using a table rolling process. The outer surfaces were sanded smooth and painted with black polyurethane paint. It is understood that other processes for tube fabrication may be used as would occur to the skilled artisan within the scope of these teachings and the appended claims, the specific fabrication process not considered limiting of the invention as defined in the appended claims.

A substantially T-shaped metallic fitting 15 is sized and configured to snugly receive and interconnect tubes 11,12,13 substantially as shown in FIGS. 1*a*,1*b*,2.In a preferred arrangement of the invention embodied in the demonstration models, fitting 15 was die cast (356) aluminum to which tubes 11,12,13 were adhesively bonded. In the demonstration models, fitting 15 was designed so that arm support tube 12 was inclined at 102° to handle tube 13 in consideration of the comfort of the user. Generally, the comfort of the user is served by maintaining the angle at greater than about 90° and preferably about 101° to 103°. Further, in the demonstration models, a high strength aerospace qualified RT curing adhesive EA9394 (Hysol Corp) was used to bond the tubes and fitting. Other commercially available adhesives may also be suitable for bonding fitting 15 to tubes 11,12,13 including 3M 1838, the same not limiting of the invention. The adhesive bond was preferred over a mechanical connector as having less weight and improved appearance. Fitting 15 was specifically designed by computer simulation for the demonstration models so that should the handle tube 13 become overloaded, the aluminum fitting would yield predictably prior to failure (breakage) of the composite tubes 11,12,13. Yielding of fitting 15 prior to failure of the composite tubes would provide to the user some advance notice of impending failure of the crutch in sufficient time to obtain a replacement crutch. Fitting 15 may be fabricated using conventional metal working techniques. It is noted that fitting 15 could comprise composite material such as that of which tubes 11,12,13 are fabricated, though less preferably because of the geometry to which a composite would need to be laid up and cured in order to fabricate the fitting.

Optional end caps 17,18 machined to size from (2024) aluminum and bonded (in the demonstration models using RT curing Shell Chemical Company adhesive EPON 828) to tubes 11,13 at the distal ends thereof, as suggested in FIG. 2, provided closure to tubes 11,13. Generally tubular shaped grip 20 comprising foam, rubber, plastic or other suitable material as would occur to the skilled artisan guided by these teachings provided a reliable and comfortable grip for the user of crutch 10. Replaceable slip resistant foot 21 of rubber or other suitable slip resistant material was disposed (press fitted) on the distal end of tube 11 substantially as shown in the figures in order to stabilize the crutch in contact with a walking surface during use.

Cuff 22 of suitable size and shape comprising metal (steel, aluminum or other), plastic, composite material, or other suitable material is attached to the upper end of arm support tube 12 and secured there to a machined aluminum fitting 23, sized to interconnect cuff 22 with tube 12, using rivets 24, bolts and nuts, adhesive or other conventional attaching means. Fitting 23 in the demonstration models was adhesively attached to tube 12 using EA9394 adhesive. Cuff 22 may be custom made or conventionally procured as would occur to the practitioner of the invention familiar with relevant prior art devices, or as would meet the needs of an individual user An advantage of the crutch of the invention is that it can be easily fitted to a potential user using personal physical measurements provided remotely by the user to the crutch manufacturer, which can be then correlated with corresponding sizes of tubes 11,12,13 in fitting the crutch to the user, without the need for personal contact between the manufacturer and the potential user. It is further noted that the crutch as described herein was configured to be not adjustable in size through the use of telescoping tubes or the like that characterize certain prior art devices because adult crutch users do not need adjustable crutches once the crutch is sized to the individual user. Eliminated thereby is the need for adjusting pins or the like. A more durable and much quieter crutch in accordance with the invention is the result. For a child, the crutch may be easily modified or inexpensively replaced as needed as the child grows and matures.

The invention therefore provides a novel custom fit carbon composite forearm crutch. It is understood that modifications to the invention may be made as might occur to one with skill in the field of the invention within the scope of the appended claims. All embodiments contemplated hereunder that achieve the objects of the invention have therefore not been shown in complete detail. Other embodiments may be developed without departing from the spirit of the invention or from the scope of the appended claims.

We claim:

1. A custom fit carbon composite forearm crutch for use by persons having lower extremity disability, comprising:

(a) first, second and third tubes of respective lengths selected according to the physical dimensions of the intended user, each of said tubes consisting of respective continuous lengths of a carbon fiber composite;

(b) a generally T-shaped unitary metallic fitting interconnecting said first, second and third tubes, said unitary metallic fitting defining an angle greater than 90° between said first and second tubes in the assembled condition, said unitary metallic fitting configured to yield predictably prior to failure of either of said first, second and third tubes;

(c) a cuff attached to the upper distal end of said first tube for receiving the arm of the user;

(d) wherein said first tube is selected in length according to forearm dimension of the intended user, and wherein said second tube is a handle of selected length for gripping by the intended user and wherein said third tube is of length selected according to the height of the user to extend to a walking surface for support of the user; and (e) an adhesive bonding said first, second and third tubes to said fitting and bonding said cuff to said first tube in order to maximize the strength of the joints between said fitting and said first, second and third tubes and between said cuff and said first tube, whereby a substantially unitary structure without wear joints is defined by said fitting and said tubes.

2. The crutch of claim 1 wherein said angle between said first and second tubes is in the range of 101° to 103°.

3. The crutch of claim 1 further comprising slip resistant material on the distal end of said third tube for contacting a walking surface by the user.

4. The crutch of claim 1 wherein said metallic fitting comprises aluminum.

* * * * *